UNITED STATES PATENT OFFICE.

HANS LABHARDT, OF MANNHEIM, GERMANY, ASSIGNOR TO BADISCHE ANILIN & SODA FABRIK, OF LUDWIGSHAFEN-ON-THE-RHINE, GERMANY, A CORPORATION.

PROCESS OF PRODUCING INDOXYLIC COMPOUNDS.

No. 891,708.          Specification of Letters Patent.         Patented June 23, 1908.

Application filed February 26, 1907. Serial No. 359,511.

*To all whom it may concern:*

Be it known that I, HANS LABHARDT, doctor of philosophy and chemist, citizen of the Swiss Republic, residing at Mannheim, Germany, have invented new and useful Improvements in the Production of Indoxylic Compounds, of which the following is a specification.

The method hitherto usually employed for the production of indoxylic compounds from phenylglycin, or the homologues, or analogues, thereof, or derivatives thereof, has consisted in treating such phenylglycin, homologue, analogue, or derivative, with an alkaline condensing agent, such, for instance, as alkali oxid, sodium alcoholate, and sodamid. When fuming sulfuric acid is employed to bring about the indoxylic ring formation, sulfonation generally takes place at the same time, so that indigo sulfoacid is obtained instead of indigo and the undesirable operation of eliminating the sulfoacid group, in order to produce the more valuable indigo, is necessary.

In the specification of the lapsed French Patent No. 310,599 it is stated that, by treating the potassium salt of acetylphenylglycin with, for instance, phosphorus oxychlorid, and then treating the chlorid of acetylphenylglycin, thus obtained, with aluminium chlorid, indoxyl can be obtained. On working according to the directions given in the said specification I have been unable, however, to obtain any indoxyl, or indigo, but I have found that if, instead of treating the chlorid of acetylphenylglycin with aluminium chlorid, the acetylphenylglycin itself be treated with aluminium chlorid, or other aluminium haloid, the ring formation takes place easily and indoxyl is obtained either as such or in the acylated form. The reaction should preferably be carried out in the absence of atmospheric air, for instance, it may be carried out in an atmosphere of hydrogen, or nitrogen, or carbon dioxid, or other indifferent gas, or *in vacuo*.

Instead of acetylphenylglycin itself, the homologues, analogues, and derivatives of these compounds (such for instance as their salts and esters) can be employed, and aluminum bromid, or aluminium iodid, can be used instead of aluminium chlorid.

The following examples will serve to illustrate further the nature of my invention and how it can be carried into practical effect, but my invention is not confined to these examples nor to the equations given therein. The parts are by weight.

Example 1. Mix thoroughly together equal parts of dried and finely powdered acetylphenylglycin and freshly prepared finely ground aluminium chlorid. Introduce the mixture into a suitable vessel, for instance an enameled iron vessel, and displace the air by means of dry hydrogen and heat in a metal, or oil, bath so that the temperature of the bath reaches about two hundred and fifty (250) degrees centigrade. The reaction mixture soon melts to a red liquid while hydrochloric acid is evolved. When the evolution is finished, allow the melt to cool, and introduce it into boiling dilute caustic soda solution, whereupon any acetylindoxyl is converted into indoxyl. If it be so desired, air can be passed through the solution, whereupon indigo is formed. The indoxyl is probably formed according to the equation

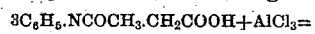
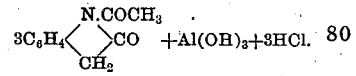

Example 2. Mix well together one (1) part of acetyltolylglycin with from three (3), to four (4), parts of aluminium chlorid. Introduce the mixture into a suitable vessel and, after removing the air therefrom as far as possible, introduce it into a metal bath heated to a temperature of from two hundred (200), to two hundred and twenty (220), degrees centigrade. The mass gives rise to a thick red liquid, while hydrochloric acid is evolved. After about thirty (30) minutes the gas-evolution is complete, then work up the melt as described in the foregoing example. The aluminium chlorid which sublimes onto the cooler parts of the vessel can be used in a further operation. The reaction which takes place can be represented by the equation

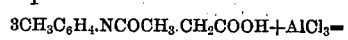
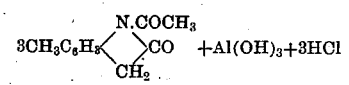

Example 3. Mix well together one (1) part of the potassium salt of acetylphenylglycin and three (3) parts of anhydrous aluminium chlorid (both finely powdered), and heat the mixture for thirty (30) minutes *in vacuo* at a tempreature of from two hundred and thirty (230), to two hundred and forty (240), degrees centigrade. A vigorous reaction takes place and the mixture melts, yielding a red liquid. Allow the melt to cool, and work up in the manner described in the foregoing Example 1. The reaction which takes place can be represented by the equation 3C$_6$H$_5$NCOCH$_3$.CH$_2$COOK+AlCl$_3$=
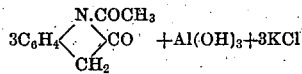

Example 4. Introduce two (2) parts of anhydrous aluminium chlorid, in small portions at a time, into one (1) part of the ethyl ester of acetylphenylglycin, while stirring and cooling the whole by means of water. During the addition a vigorous reaction takes place. When the addition of the chlorid is complete, heat in an atmosphere of hydrogen for thirty (30) minutes at a temperature of from two hundred and twenty (220), to two hundred and thirty (230), degrees centigrade, and then work up the product as described in the foregoing Example 1. The reaction which takes place can be represented by the equation 3C$_6$H$_5$N.COCH$_3$.CH$_2$COOC$_2$H$_5$+AlCl$_3$=
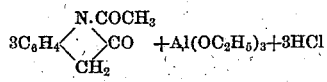

Instead of using acetylglycins, other glycins, in which the amido group contains other fatty, or aromatic, acid radicals, can be employed, and glycins of the benzene, or naphthalene, series may be used, so that the general formula of the compounds which can be used according to this invention is Aryl—NAc.CH$_2$.COOH, and of course, as aforesaid, the derivatives, such as the salts and esters, of these compounds can be employed and for the purposes of this invention these derivatives are equivalents of the free glycins. In each case the corresponding indoxyl either as such or in its acylated form is obtained and this can be converted into the corresponding indigo dye in the usual, or any suitable, manner. If in the above examples the aluminium chlorid be replaced by an equivalent quantity of aluminium bromid, the reaction proceeds in a similar manner.

Now what I claim is:

1. The process of producing indoxylic compounds by reacting on an acylated aryl-glycin with aluminium haloid.

2. The process of producing indoxylic compounds by reacting on acetylphenylglycin with aluminium chlorid.

In testimony whereof I have hereunto set my hand in the presence of two subscribing witnesses.

HANS LABHARDT.

Witnesses:
ERNEST G. EHRHARDT,
H. W. HARRIS.